United States

Iizuka et al.

[11] 4,063,800
[45] Dec. 20, 1977

[54] ZOOM LENS FOR A PROJECTOR

[75] Inventors: Yutaka Iizuka, Yokohama; Soichi Nakamura, Kamakura, both of Japan

[73] Assignee: Nippon Kogaku K.K., Tokyo, Japan

[21] Appl. No.: 642,603

[22] Filed: Dec. 19, 1975

[30] Foreign Application Priority Data

Dec. 28, 1974 Japan .................................. 50-1296

[51] Int. Cl.$^2$ .............................................. G02B 15/14
[52] U.S. Cl. .................................................. 350/184
[58] Field of Search ............... 350/184, 215, 214, 186

[56] References Cited

U.S. PATENT DOCUMENTS

| 2,701,982 | 2/1955 | Angenieux | 350/215 |
| 3,457,003 | 7/1969 | Macher | 350/184 |

Primary Examiner—Conrad J. Clark
Attorney, Agent, or Firm—Shapiro and Shapiro

[57] ABSTRACT

A zoom lens system for a projector has three groups of lenses. The first lens group closest to the object has a composite converging function achieved by a doublet consisting of a first positive lens and a first negative lens. The second lens group is located between the other groups and is movable along the optical axis of the lens system relative to the other groups for varying magnification. It has a composite diverging function achieved by a doublet consisting of a second negative lens and a second positive meniscus lens. The third lens group most remote from the object has a composite converging function achieved by a third biconvex positive lens, a fourth positive lens, a forward meniscus lens consisting of a fifth positive lens joined to a third negative lens and having the convex surface thereof facing the object, a rearward meniscus lens consisting of a fourth negative lens joined to a sixth positive lens and having the concave surface thereof facing the object, a seventh biconvex positive lens, and an eighth positive lens.

2 Claims, 4 Drawing Figures

SPHERICAL ABERRATION f=1.0 f=1.33 f=1.75

ASTIGMATISM

DISTORTION

ZOOM LENS FOR A PROJECTOR

BACKGROUND OF THE INVENTION

1. Field of the Invention

This invention relates to a zoom lens system and is more particularly directed to a zoom lens system having a relatively large aperture whereby the system is suitable for use in a projector.

2. Description of the Prior Art

In a projector, a brighter lens system is achieved when more light from the source falls on the screen, and the projected images are magnified and thus are easier to view. However, as the brightness of the lens system increases, the apparent depth of focus becomes narrower, and it becomes necessary to provide better correction of aberrations and better balance between the components of the system as compared to a darker lens system.

SUMMARY OF THE INVENTION

The present invention provides a zoom lens system which has a relative aperture as great as F/1.0, and which corrects for various aberrations.

According to the invention, a zoom lens system for a projector has three groups of lenses. The first group closest to the object (i.e., closest to the screen) has a composite converging function, and includes a doublet consisting of a first positive lens and a first negative lens. The second lens group is movable along the optical axis of the lens system relative to the other groups for varying magnification, and has a composite diverging function. This lens group includes a doublet consisting of a second negative lens and a second positive meniscus lens. The third lens group, which is most remote from the object, has a composite converging function, and includes a third biconvex positive lens; a fourth positive lens; a forward meniscus lens consisting of a fifth positive lens joined to a third negative lens, the convex surface of the forward meniscus lens facing the object; a rearward meniscus lens consisting of a fourth negative lens joined to a sixth positive lens, the concave surface of the rearward meniscus lens facing the object; a seventh biconvex positive lens; and an eighth positive lens.

BRIEF DESCRIPTION OF THE DRAWINGS

An embodiment of the invention is illustrated in the accompanying drawings wherein.

DESCRIPTION OF THE PREFERRED EMBODIMENTS

Figure 1:
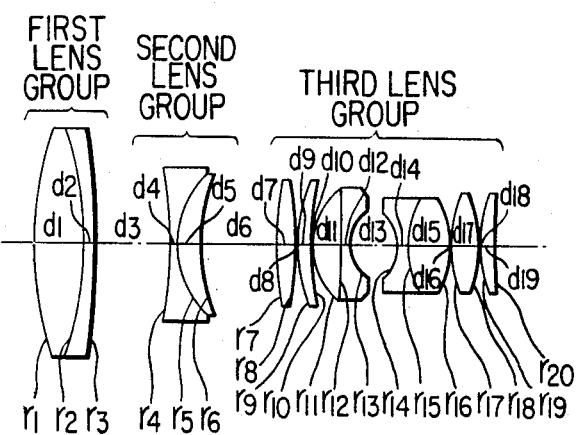
FIG. 1 is a cross-sectional view of a zoom lens system according to the invention, this view showing the system in an intermediate focal length position.
Figure 2A:
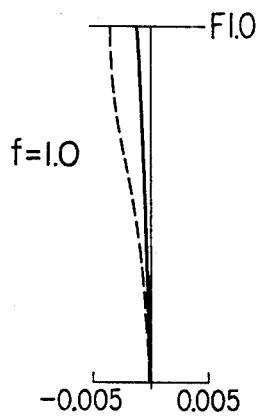
FIGS. 2A, 2B and 2C illustrate various aberrations in the lens system when it is in various focal length positions.
Figure 2A:
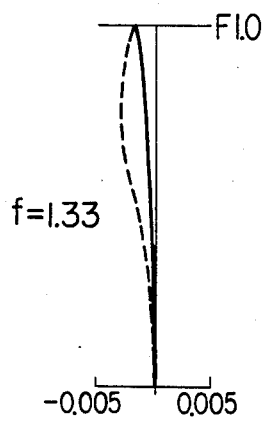
Figure 2A:
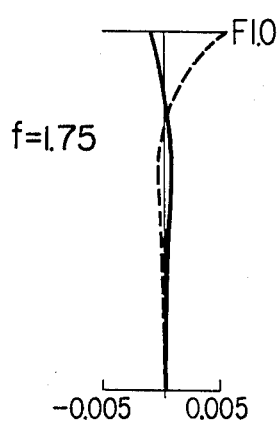
Figure 2B:
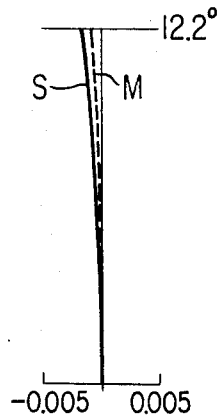
Figure 2B:
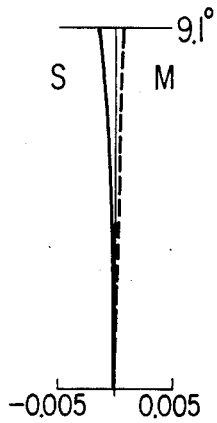
Figure 2B:
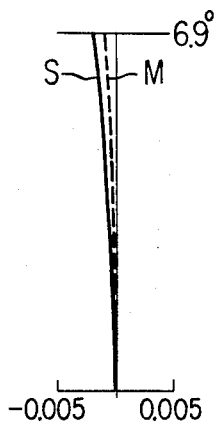
Figure 2C:
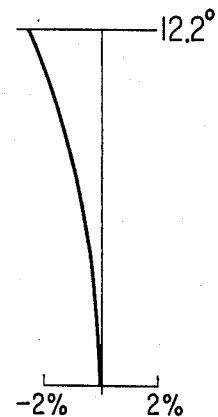
Figure 2C:
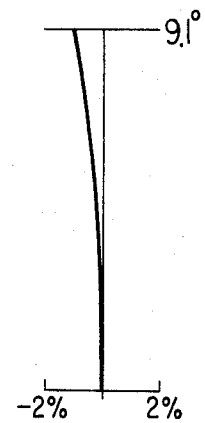
Figure 2C:
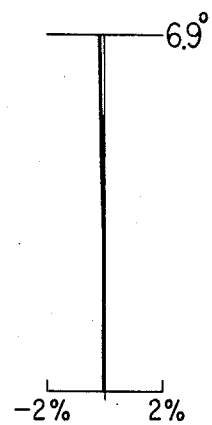

Referring to FIG. 1, the zoom lens system according to the invention comprises three groups of lenses. The first lens group closest to the object (i.e., closest to the screen) has a first positive lens joined to a first negative lens thereby establishing a positive (i.e., converging) composite. The second lens group is located between the other groups and is movable along the optical axis of the lens system relative to the other groups for varying magnification. It consists of a second negative lens joined to a second positive meniscus lens thereby establishing a negative (i.e., diverging) composite. The third lens group is most remote from the object and is of a modified Gauss type consisting of a third biconvex positive lens; a fourth positive lens; a forward meniscus lens consisting of a fifth positive lens joined to a third negative lens, the convex surface of the forward meniscus lens facing the object; a rearward meniscus lens consisting of a fourth negative lens joined to a sixth positive lens, the concave surface of the rearward maniscus lens facing the object; a seventh biconvex positive lens and an eighth positive lens establishing a positive (i.e., converging) composite.

The lens system satisfies the following conditions:

(1) $4.3 f_{min} < f_1 < 7.8 f_{min}$
(2) $0.25 < |r_1/r_3| < 0.6$
(3) $30 < \nu_1 - \nu_2$
(4) $0.5 f_1 < |r_2| < 0.8 f_1$
(5) $1.9 f_{min} < |f_2| < 2.8 f_{min}$
(6) $1.7 < |r_4/r_6| < 3.6$
(7) $15 < \nu_3 - \nu_4$
(8) $\nu_3 < 46$
(9) $0.3 |f_2| < r_5 < 0.5 |f_2|$ where $f_{min}$: the shortest focal length of the entire lens system
$f_1$: combined focal length of the first lens group
$f_2$: combined focal length of the second lens group
$\nu_i$: Abbe number of the $i$th lens as viewed from the object side
$r_j$: radius of curvature of the $j$th surface as viewed from the object side The significance of conditions (1) to (9) are described below.

Condition (1) is the condition prescribing the focal length of the first lens group. Due to the nature of the magnification varying section of the zoom lens (i.e., the first and the second lens group taken together), this condition may also be regarded as the condition for prescribing the size of the magnification varying section with respect to the third lens group. Since the focal length of the magnification varying section of the zoom lens is usually greater than the focal length of the third lens group, the variation in aberrations caused by zooming is smaller, but this is not compatible with the desire to reduce the size of the entire lens system. Conversely, if the focal length of the magnification varying section is reduced in order to reduce the size without regard to other effects, the aberration caused by zooming will be difficult to correct. For this reason, the focal length of the first lens group should be selected with the two factors discussed above taken into account. Especially, in the case of the magnification varying section of a large aperture zoom lens which has a smaller viewing angle but has a brightness of F/1.0, the fluctuation of spherical aberration caused by zooming presents a problem. That is, to say, if the upper limit of the above condition (1) is exceeded, the brightness provided by the first lens group alone will be as dark as F/4.6 or more so that the fluctuation of spherical aberration caused by zooming will become easier to correct; however, the length of the entire system will be greater by 13% or more than that of the system in accordance with the illustrated embodiment of the invention. Also, if the lower limit of the condition is exceeded, the brightness will be F/2.5 or less so that the spherical aberration of the lens group at the longer focal length side will be excessively negative. Even if such spherical aberration at the longer focal length side is balanced by the second lens group, the corresponding spherical aberration in the intermediate focal length will become excessively positive so that the fluctuation of spherical aberration caused by zooming becomes difficult to eliminate.

Condition (2) is the condition which prescribes the form of bending of light rays of the first lens group under the power distribution of condition (1). Since marginal rays are passed through the outermost periphery of the first lens group at the longer focal length, the first lens group will have a great influence on the spherical aberration occurring at longer focal lengths. As to non-axial principal rays, the first group will have a great influence on the distortion and the curvature of the image field occurring at the longer focal lengths because this group is most remote from the diaphragm. Therefore, if the upper limit of this condition is exceeded, the curvature of image field at longer focal lengths will be excessively positive, and the coma will be correspondingly increased. If the lower limit is exceeded, the curvature of image field at longer focal lengths will be excessively negative and the coma will be correspondingly increased. Thus, if the upper and the lower limit are exceeded, the aberrations caused by zooming will be difficult to balance even if they are corrected by the second lens group.

Condition (3) is the condition that should be satisfied by the Abbe numbers of the positive and negative lenses of the first lens group when joined together, in order to effect achromatization in the first lens group. If the achromatization is to be effected beyond the range of this condition, the powers of the positive and negative lenses, respectively, must be further increased under the constraint that the power of the first lens group as a whole be kept constant. This constraint would make the other aberrations difficult to correct.

Condition (4) represents the condition for effecting achromatization of the first lens group and the correction of the aberrations by the joined surfaces of the first positive and negative lenses when the bending and the Abbe numbers prescribed by conditions (2) and (3) are followed. If the positive and the negative lenses of the first group are to satisfy condition (3) by using usual glass, the refractive index of the negative lens must be higher than that of the positive lens so that, unless a special form of joining is devised, the joined surface $r_2$ will have a negative power, i.e., will be concave toward the object. Therefore, if the upper limit of this condition is exceeded, the curvature of the image field, especially at the longer focal lengths, will be excessively negative and the coma would be excessive. As a result of the excessive coma, the axial or longitudinal chromatic aberration and the chromatic difference of magnification (the lateral chromatic aberration) would be excessively negative and excessively positive, respectively. If the lower limit is exceeded, the curvature of the image field would be excessively positive, and the coma would be excessive, so that the axial chromatic aberration and the chromatic difference of magnification would be excessively positive and excessively negative, respectively.

Condition (5) prescribes the optimum amount of movement of the second lens group for the magnification varying section to obtain the desired magnification. This condition also is intended to provide optimum correction of the fluctuation of various aberrations, especially spherical aberration, caused by zooming. By selecting the focal length of the second lens group to the value indicated, the negative power of this lens group may be made higher than that heretofore considered practical, and the accompanying positive spherical aberration may be effictively utilized in balancing against the aberration of the first lens group, thereby providing a well-corrected condition.

Where the second lens group comprises a positive and a negative lens, and is rectilinearly movable to vary magnification and has a zoom ratio that varies within a relatively small range, it is conventional to design the second lens group so that the object point and the image point with respect to the second lens group are in equidistant relationship when the second lens group is moved. If the upper limit of the condition is exceeded, the brightness of the second lens group determined by the effective diameter thereof during the use of its greatest focal length will be F/2.7 or darker to facilitate the condition of the fluctuation of spherical aberration caused by zooming. When the second lens group effects 1.75X magnification, the amount of movement of this group will be greater by as much as 16.3%, and the resultant device will be inconvenient to use. If the lower limit is exceeded, the brightness of the second lens group will be F/1.6 or brighter so that the spherical aberration in the second lens group at the longer focal length side will be excessively positive. Therefore, even if the negative spherical aberration of the first lens group is used to correct the positive spherical aberration of the second lens group, the positive spherical aberration of the second lens group at the intermediate focal length cannot be compensated, and the extra correction required will be difficult to achieve.

Condition (6) provides the condition for the bending of light rays of the second lens group under the power distribution of condition (5). Since the second lens group has a negative refraction power, the distance between the second lens group and the object point becomes equal to the distance between the second lens group and the image point during movement of the second lens group to achieve magnification. The influence of the second lens group on the positive spherical aberration of marginal rays is greater for the longer focal lengths. For non-axial principal rays, the incidence height of such rays on the second lens group is higher for shorter focal lengths, and the incidence angle is also greater in this direction. Therefore, the influence on the distortion is more pronounced at the shorter focal length side, but since the magnification of the second lens group at the shorter focal length side is lower than that at the longer focal length, the influence on the curvature of image field is substantially uniform throughout the entire range of magnification. Thus, if the upper limit of the condition is exceeded, the distortion will be excessively negative at shorter focal lengths, while the curvature of image field will be excessively positive throughout the entire range of magnification. Furthermore, spherical aberration will be excessively positive at longer focal lengths so that it will be difficult to correct for aberrations resulting from zooming. If the lower limit is exceeded, the distortion will be excessively positive at shorter focal lenghs while the curvature of the image field will be excessively negative throughout the entire range of magnification. In addition, the spherical aberration will be excessively negative at longer focal lengths, thus making it difficult to correct for aberrations.

Condition (7) is the condition that should be satisfied by the Abbe numbers of the negative and positive lenses of the second group when joined together in order to effect the achromatization of the second group. If the achromatization is to be effected beyond the range of this condition, the powers of the positive and negative lenses will have to be further increased under the constraint that the power of the second lens group as a whole be kept constant. This constraint would make the other aberrations difficult to correct.

Condition (8) is the condition for effecting achromatization of the second lens group, especially to achieve good correction of the chromatic difference of magnification. If consideration is given only to the condition for the axial achromatization effected by a group consisting of a positive and a negative lens joined together, then the Abbe number $\nu_3$ should be greater for a negative lens of the second lens group having a negative power as a whole. However, if the Abbe number is further increased beyond the range of condition (8), the chromatic difference of magnification would be excessively positive, and this is difficult to correct.

Condition (9) represents the condition for effecting the achromatization of the second lens group under the form of bending of the light rays and the Abbe numbers of the negative and positive lenses prescribed by conditions (6), (7) and (8), and for effecting the correction of the aberrations caused by the joined surface. In order to maintain a bright second lens group using only a doublet, the two lenses forming the doublet should desirably be formed of a glass having a refractive index of 1.7 or more. Therefore, the difference in refractive index between the joined positive and negative lenses cannot be relatively great. However, the power of the second lens group is higher than the other lens groups and thus the joined surface $r_5$ has a considerably intense radius of curvature and cannot be regarded merely as a hyperchromatic achromatizing surface. If the upper limit is exceeded, the spherical aberration will be excessively positive at longer focal lengths, the distortion will be excessively negative at shorter focal lengths, and the curvature of the image field will be excessively positive throughout the entire range of magnification. Accordingly, the coma would be increased, with a result that the axial chromatic aberration would be excessively positive and the chromatic difference of magnification would be excessively negative. If the lower limit is exceeded, the spherical aberration would be excessively negative at longer focal lengths, the distortion would be excessively positive at shorter focal lengths, and the curvature of the image field would be excessively negative throughout the entire magnification varying area. Also, the coma would be increased with the result that the axial chromatic aberration would be excessively negative and the chromatic difference of magnification would be excessively positive.

An example of the present invention is given below. In the example, $r_1$ to $r_{20}$ represent the curvature radii of the lenses, $d_1$ to $d_{19}$ represent the center thicknesses of the lenses and air spaces between the lenses, $N_1$ to $N_{12}$ represent the refractive indices of the lenses, and $\nu_1$ to $\nu_{12}$ represent the Abbe numbers of the lenses.

Example:
f = 1.0 − 1.75
Relative aperture 1 : 1.0
Angle of view 24.4° − 13.8°
$f_1 = 6.0076$
$f_2 = 2.3741$

| | | | |
|---|---|---|---|
| $r_1 = 4.0000$ | $d_1 = 0.5500$ | $N_1 = 1.56384$ | $\nu_1 = 60.8$ |
| $r_2 = -4.0000$ | $d_2 = 0.1063$ | $N_2 = 1.79504$ | $\nu_2 = 28.4$ |
| $r_3 = -9.3444$ | $d_3 = $ Variable | | |
| $r_4 = -5.2244$ | $d_4 = 0.0688$ | $N_3 = 1.70154$ | $\nu_3 = 41.1$ |
| $r_5 = 0.9970$ | $d_5 = 0.2750$ | $N_4 = 1.80518$ | $\nu_4 = 25.5$ |
| $r_6 = 2.0774$ | $d_6 = $ Variable | | |
| $r_7 = 7.3731$ | $d_7 = 0.2063$ | $N_5 = 1.65160$ | $\nu_5 = 58.5$ |
| $r_8 = -7.3731$ | $d_8 = 0.0063$ | | |
| $r_9 = 1.5972$ | $d_9 = 0.1688$ | $N_6 = 1.76684$ | $\nu_6 = 46.6$ |
| $r_{10} = 5.7600$ | $d_{10} = 0.0125$ | | |
| $r_{11} = 0.7907$ | $d_{11} = 0.3250$ | $N_7 = 1.74443$ | $\nu_7 = 49.4$ |
| $r_{12} = -10.0000$ | $d_{12} = 0.0625$ | $N_8 = 1.62004$ | $\nu_8 = 36.3$ |
| $r_{13} = 0.4406$ | $d_{13} = 0.4938$ | | |
| $r_{14} = -0.5081$ | $d_{14} = 0.1438$ | $N_9 = 1.74077$ | $\nu_9 = 27.7$ |
| $r_{15} = 0.8931$ | $d_{15} = 0.4500$ | $N_{10} = 1.71300$ | $\nu_{10} = 53.9$ |
| $r_{16} = -0.8931$ | $d_{16} = 0.0125$ | | |
| $r_{17} = 2.3246$ | $d_{17} = 0.2813$ | $N_{11} = 1.71300$ | $\nu_{11} = 53.9$ |
| $r_{18} = -2.3246$ | $d_{18} = 0.0063$ | | |
| $r_{19} = 1.2196$ | $d_{19} = 0.1875$ | $N_{12} = 1.71300$ | $\nu_{12} = 53.9$ |
| $r_{20} = 14.0026$ | | | |

| Focal length | $d_3$ | $d_6$ | Back-focus |
|---|---|---|---|
| 1.0 | 0.1064 | 1.5233 | 0.6406 |
| 1.33 | 0.8111 | 0.8186 | 0.6471 |
| 1.75 | 1.4299 | 0.1999 | 0.6354 |

The present invention thus provides a zoom lens system which is simple in construction, but has a relatively large aperture with good correction of various aberrations and with a good balance provided by the predetermined conditions imposed upon the first and second lens group of the three group lens system.

It is believed that the advantages and improved results provided by the zoom lens system of the invention will be apparent from the described embodiment of a preferred form of the invention. Various changes may be made without departing from the spirit and scope of the invention as sought to be defined in the following claims.

We claim:

1. A zoom lens system for a projector comprising three groups of lens oriented as follows in a direction from the object side:
 a. a first lens group having a composite converging function and including a doublet consisting of a first positive lens and a first negative lens;
 b. a second lens group located between the other groups and movable along the optical axis of the system relative to the other groups for varying magnification, the second group having a composite diverging function, and including a doublet consisting of a second negative lens and a second positive meniscus lens; and
 c. a third lens group having a composite converging function, and including a third biconvex positive lens; a fourth positive lens; a forward meniscus lens consisting of a fifth positive lens joined to a third negative lens, the convex surface of the forward meniscus lens facing the object; a rearward meniscus lens consisting of a fourth negative lens joined to a sixth positive lens, the concave surface of the rearward meniscus lens facing the object; a seventh biconvex positive lens; and an eighth positive lens.

2. A zoom lens system according to claim 1 which has the data as follows:

f = 1.0 − 1.75
Relative aperture 1 : 1.0
Angle of view 24.4° − 13.8°
$f_1 = 6.0076$
$f_2 = 2.3741$

| | | | |
|---|---|---|---|
| $r_1 = 4.0000$ | $d_1 = 0.5500$ | $N_1 = 1.56384$ | $\nu_1 = 60.8$ |
| $r_2 = -4.0000$ | $d_2 = 0.1063$ | $N_2 = 1.79504$ | $\nu_2 = 28.4$ |
| $r_3 = -9.3444$ | $d_3 = $ Variable | | |
| $r_4 = -5.2244$ | $d_4 = 0.0688$ | $N_3 = 1.70154$ | $\nu_3 = 41.1$ |
| $r_5 = 0.9970$ | $d_5 = 0.2750$ | $N_4 = 1.80518$ | $\nu_4 = 25.5$ |
| $r_6 = 2.0774$ | $d_6 = $ Variable | | |

-continued

| | | | |
|---|---|---|---|
| $r_7 = 7.3731$ | $d_7 = 0.2063$ | $N_5 = 1.65160$ | $\nu_5 = 58.5$ |
| $r_8 = -7.3731$ | $d_8 = 0.0063$ | | |
| $r_9 = 1.5972$ | $d_9 = 0.1688$ | $N_6 = 1.76684$ | $\nu_6 = 46.6$ |
| $r_{10} = 5.7600$ | $d_{10} = 0.0125$ | | |
| $r_{11} = 0.7907$ | $d_{11} = 0.3250$ | $N_7 = 1.7443$ | $\nu_7 = 49.4$ |
| $r_{12} = -10.0000$ | $d_{12} = 0.0625$ | $N_8 = 1.62004$ | $\nu_8 = 36.3$ |
| $r_{13} = 0.4406$ | $d_{13} = 0.4938$ | | |
| $r_{14} = 0.5081$ | $d_{14} = 0.1438$ | $N_9 = 1.74077$ | $\nu_9 = 27.7$ |
| $r_{15} = 0.8931$ | $d_{15} = 0.4500$ | $N_{10} = 1.71300$ | $\nu_{10} = 53.9$ |
| $r_{16} = -0.8931$ | $d_{16} = 0.0125$ | | |
| $r_{17} = 2.3246$ | $d_{17} = 0.2813$ | $N_{11} = 1.71300$ | $\nu_{11} = 53.9$ |
| $r_{18} = -2.3246$ | $d_{18} = 0.0063$ | | |
| $r_{19} = 1.2196$ | $d_{19} = 0.1875$ | $N_{12} = 1.1.71300$ | $\nu_{12} = 53.9$ |

-continued

| $r_{20} = 14.0026$ | | | |
|---|---|---|---|
| Focal length | $d_3$ | $d_6$ | Back-focus |
| 1.0 | 0.1064 | 1.5233 | 0.6406 |
| 1.33 | 0.8111 | 0.8186 | 0.6471 |
| 1.75 | 1.4299 | 0.1999 | 0.6354 | where $r_1$ to $r_{20}$ represent the curvature radii of the lenses, $d_1$ to $d_{19}$ represent the center thicknesses of the lenses and air spaces between the lenses, $N_1$ to $N_{12}$ represent the refractive indices of the lenses, and $\nu_1$ to $\nu_{12}$ represent the Abbe numbers of the lenses.

* * * * *